Patented May 30, 1944

2,349,844

UNITED STATES PATENT OFFICE 2,349,844

CATALYST CARRIER

Johann Adam Bertsch, deceased, late of St. Louis, Mo., by Manufacturers Bank & Trust Company of St. Louis, executor, St. Louis, Mo.

No Drawing. Continuation of application Serial No. 318,627, February 12, 1940. This application July 29, 1942, Serial No. 452,684

6 Claims. (Cl. 252—235)

This invention relates to carriers or supports for catalytic materials, and it has special application to carriers which are suitable for use in catalytic vapor phase chemical reactions.

In the development of catalytic processes, considerable attention has been given to the finding of suitable carriers on which to support the particular catalyst to be used. As a result, many materials have been suggested for use as carriers. Among these materials may be mentioned pumice, clay, asbestor, sand, Alundum, glass wool, kieselguhr, nickel, iron, etc.

Notwithstanding the numerous materials which have been suggested, there is still need for a suitable carrier. The requirements for carriers are so stringent that it is understandable that such is the case. To mention a few of these requirements it may be stated that a carrier should be inert under the conditions of the reaction; it should be sufficiently strong so as to withstand physical stresses; it should not be affected injuriously during use for a reasonable period; it should not deleteriously affect the production of the desired products; it should lend itself to the facile charging of and removal from catalytic converters; etc. It is noted also that the art quite generally holds that a suitable carrier should be a good conductor of heat and that it should have a rough surface.

This invention has for an object the provision of a novel catalyst carrier which possesses a combination of desirable properties not possessed by any known catalyst carrier.

Another object is to provide a catalyst carrier which may be coated in a simple manner with the catalyst to be used and which can easily be placed in position in a catalytic chamber and removed therefrom when desired.

Other objects of the invention will be apparent to those skilled in the art from a reading of the following description.

It has now been found that a carrier which fulfills the foregoing as well as other objects can be made from flexible glass or quartz fibers in spun, twisted or braided form, for example, in the form of string, cord, rope and the like. This finding is quite unexpected because quartz and glass, as is well known, are rather poor heat conductors and the fibers thereof are smooth. These characteristics would have indicated the unsuitability of glass and quartz fibers for use as catalyst carriers.

It is known that glass wool and asbestos have been suggested as carriers. However, these materials are not suitable in many reactions, for example, the vapor phase oxidation of toluene to benzaldehyde. It is difficult to fill the tubes of a tubular catalyst reaction vessel evenly with these materials without the occurrence of varying degrees of packing in the various tubes. The reacting gases, as well as other gases which may be used, are thereby unevenly distributed in the various tubes. Non-uniform resistance to gas flow is also caused by the disintegration during use of the fibers of glass wool and asbestos. As is well known, non-uniform resistance to the passage of gases is highly undesirable. Other disadvantages of asbestos and glass wool include the poor adhesion of many catalysts thereto, brittleness of glass wool and the low tensile strength of asbestos. These factors have the effect of rendering operations difficult, of reducing reaction rates, of causing losses in catalytic material; and they are otherwise undesirable.

It is also known that organic fibrous materials have been suggested as carriers for use in certain catalytic processes. The disadvantage of such carriers, for example, cotton, hemp, flax, and the like, is that they do not withstand the temperatures under which various reactions are conducted. Consequently, the carriers disintegrate and the catalytic materials collect at the bottom of the catalyst chamber, conditions which are very undesirable.

The carriers of this invention are characterized in that they are flexible, fibrous, relatively strong, substantially temperature-resistant and inert inorganic materials. The individual fibers have a diameter of the order of 0.001 inch or less, for example 0.0003 inch. The physical form of the carriers contemplated by this invention is one exemplified by the popular meaning attributed to the words "string," "cord" or "rope." That is to say, the carriers of this invention are quasi-cylindrical or flat in shape and have a length to diameter or width ratio which is very high. The actual diameter or width may vary over rather wide limits, but it is advantageous to use carriers having a diameter or width of between 2 to 5 millimeters, for example 2 millimeters. The carriers, coated with catalytically-active material, may be attached to suitable supports and suspended in parallel or substantially parallel alignment. It will be understood that the diameter or width of the carrier, the number of contact masses per catalyst chamber, and the distance between contact masses may be varied to fit the requirements or conditions of the particular reaction. It will be further understood that cloth, gauze and bag forms of glass or quartz are not included within the scope of this invention. Glass products coming within this invention are sold commercially under the name "Fiberglas."

The catalyst to be used may be applied to the carrier in a simple manner. The catalytically-active material may be applied to the surface of the carrier by rubbing it on in the form of a sludge, or by spraying it, or by other methods known to the art. Promoters, such as alkali hydroxides, may be used in connection with the catalyst. If desired, the carrier may be subjected to an etching process before the catalyst is applied.

The contact mass, comprising the carrier and catalytically-active material, may then be treated in known manner according to the particular composition of the catalyst in order to fix it on the carrier in desired chemical as well as physical form.

The thickness of the catalyst coating applied to the carrier may also be varied to suit the individual case. A feature of this invention is that very thin coatings are feasible with the herein-disclosed carriers. The invention is not to be restricted, however, to any special percentage of catalyst coated on the carrier. Moreover, it will be apparent that it is physically impossible to prevent some catalyst from going below the surface of the carrier when the catalyst is applied to the carrier. The word "deposited" in the claims is to be construed in relation to the foregoing.

The contact masses prepared according to this invention possess properties which render them eminently suitable for use in catalytic reactions. Substantially all of the catalytically-active material can be exposed to the reactants, thus enabling maximum catalytic efficiency to be obtained. This may be compared with the very different situation applying to carriers in granular form, for example, pellets, whose use renders a part of the catalytic surface ineffective because said part does not come in contact with the reactants during use.

Another advantage of the herein-disclosed contact masses is that they render it easy to charge and discharge catalytic chambers or converters. On the other hand, where a granulated contact mass is used, great care must be exercised in filling converters in order to insure a uniform distribution of reactants, which uniformity is extremely desirable in vapor phase catalytic reactions. Wool-like supports are even harder to apply in such a way as to secure uniformity. The removal from the converter of the contact masses herein-disclosed is also a simple operation, as all one has to do is to pull the mass in string, cord, or rope form from the chamber.

The contact masses provided herein lend themselves to use in catalyst chambers which may assume any desired position. This is not feasible with non-fibrous carriers. Moreover, the present fibrous carriers are the first of such type in continuous form which are satisfactory for use in vapor phase reactions where temperatures of the order of 500° C., or higher, sometimes are used. Quartz fibers may be employed at and above temperatures at which glass fibers soften or melt. The temperature at which glass fibers soften or melt vary according to the composition of the glass.

It follows, from the fact that the instant carriers may be aligned very easily in parallel or substantially parallel rows in the catalyst chamber, that the desirable objective in vapor phase reactions of obtaining uniform resistance to the passage of gases is easily attained by the use of said carriers.

An example illustrating the process of this invention is set forth. All parts are by weight.

A sludge of catalytically-active material was made as follows:

20 parts of pulverized vanadium pentoxide were mixed with 80 parts of water and 20 parts of 93% strength sulfuric acid. The contents were brought to a boil and sulfur dioxide gas was introduced until a blue color developed. After diluting the mixture to about 300 parts of water, 80 parts of 28% strength ammonia solution were added. A dark brown paste of tetravalent vanadium oxide formed. 2½ parts of potassium hydroxide were added to the sludge after the latter was washed with water.

The sludge thus formed was rubbed on to flexible glass cord ("Fiberglas") of 2 millimeters diameter, and allowed to dry at room temperature.

The resulting contact mass was treated for 1 to 2 hours in an air stream at 425° C. and employed in known vapor phase catalytic oxidation processes for converting toluene to benzaldehyde or benzoic acid.

It is apparent to those skilled in the art that many modifications of this invention are possible. It is to be understood that though a preferred embodiment of this invention contemplates the provision of contact masses comprising the instant carriers and oxidation catalysts for use in connection with various vapor phase catalytic processes, the invention is not to be limited thereby but is to be construed as broadly as permissible in view of the prior art limited solely by the appended claims.

This is effectively a continuation application of Serial Number 318,627, filed February 12, 1940.

What is claimed as new is:

1. The contact mass comprising a cord-type carrier selected from the group consisting of glass and quartz, characterized by being flexible, fibrous, relatively strong, relatively temperature resistant and having an individual fiber diameter of substantially 0.0003 to 0.001 inch, and a catalyst deposited thereon.

2. The contact mass comprising a cord-type carrier selected from the group consisting of glass and quartz, characterized by being flexible, fibrous, relatively strong, relatively temperature resistant and having an individual fiber diameter of substantially 0.0003 to 0.001 inch, and an oxide of vanadium deposited thereon.

3. The contact mass comprising a glass cord-type carrier, characterized by being flexible, fibrous, relatively strong, relatively temperature resistant and having an individual fiber diameter of substantially 0.0003 to 0.001 inch, and a catalyst deposited thereon.

4. The contact mass comprising a glass cord-type carrier, characterized by being flexible, fibrous, relatively strong, relatively temperature resistant and having an individual fiber diameter of substantially 0.0003 to 0.001 inch, and an oxide of vanadium deposited thereon.

5. The contact mass comprising a glass cord-type carrier, characterized by being flexible, fibrous, relatively strong, relatively temperature resistant, having an individual fiber diameter of substantially 0.0003 to 0.001 inch and an overall diameter of 2 to 5 millimeters, and a catalyst deposited thereon.

6. The contact mass comprising a glass cord-type carrier, characterized by being flexible, fibrous, relatively strong, relatively temperature resistant, having an individual fiber diameter of substantially 0.0003 to 0.001 inch and an over-all diameter of 2 to 5 millimeters, and an oxide of vanadium deposited thereon.

MANUFACTURERS BANK & TRUST
    COMPANY OF ST. LOUIS,
*Executor of the Estate of Johann Adam Bertsch, Deceased,*
  By HUGH B. ROSE,
    *Trust Officer.*

CERTIFICATE OF CORRECTION.

Patent No. 2,349,844.　　　　　　　　　　　　　　　　May 30, 1944.

JOHANN ADAM BERTSCH, DECEASED,
by MANUFACTURERS BANK & TRUST COMPANY OF ST. LOUIS,
EXECUTOR.

It is hereby certified that the above numbered patent was erroneously issued to "MANUFACTURERS BANK & TRUST COMPANY OF ST. LOUIS, as executor of JOHANN ADAM BERTSCH, deceased" whereas said patent should have been issued to --BURTON T. BUSH, INC., of Delawanna, New Jersey, a corporation of New Jersey--, as assignee of the entire interest therein; and that the said Letters Patent should be read with this correction therein that the same may conform to the record of the case in the Patent Office.

Signed and sealed this 22nd day of August, A. D. 1944.

Leslie Frazer (Seal)　　　　　　　　　　　　　　　Acting Commissioner of Patents.